(12) United States Patent
Ouyang et al.

(10) Patent No.: US 9,451,473 B2
(45) Date of Patent: Sep. 20, 2016

(54) ANALYZING AND FORECASTING NETWORK TRAFFIC

(71) Applicant: CELLCO PARTNERSHIP, Basking Ridge, NJ (US)

(72) Inventors: Ye Ouyang, Basking Ridge, NJ (US);
Carol Becht, Boonton, NJ (US);
Gopinath Venkatasubramaniam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 193 days.

(21) Appl. No.: 14/247,798

(22) Filed: Apr. 8, 2014

(65) Prior Publication Data
US 2015/0289146 A1 Oct. 8, 2015

(51) Int. Cl.
*H04W 16/22* (2009.01)
*H04L 12/801* (2013.01)
*H04W 16/00* (2009.01)

(52) U.S. Cl.
CPC ............ *H04W 16/22* (2013.01); *H04L 47/127* (2013.01); *H04W 16/00* (2013.01)

(58) Field of Classification Search
None
See application file for complete search history.

(56) References Cited

U.S. PATENT DOCUMENTS

2014/0111517 A1\* 4/2014 Vela .................. H04W 4/24 345/440
2014/0358833 A1\* 12/2014 Biem ................. G06N 5/046 706/21

OTHER PUBLICATIONS

Au et al "Automatic Forecasting of Double Seasonal Time Series with Applications on Mobility Network Traffic Prediction", 2011 Joint Statistical Meetings, Jul. 30-Aug. 4.\*
Recommendation ITU-T E.800, Series E: Overall Network Operation, Telephone Service, Service Operation and Human Factors; Definitions of Terms Related to Quality of Service (2008).
3GPP TS 36.331 v8.0.0, 3rd Generation Partnership Project, Technical Specification (Release 8) (2007).
Ikuno et al., "System Level Simulation of LTE Networks," IEEE 71st Vehicular Technology Conference: VTC2010—Spring, pp. 16-19 (2010).
Grillo et al., "Implementation Options and Economics of Phased UMTS Deployment," Journal of Communications and Networks, 4(4)282-291 (2002).
Ricciato et al., "Traffic Analysis at Short Time-Scales: An Empirical Case Study From a 3G Cellular Network," IEEE Transactions on Network and Service Management, 5(1):11-21 (2008).

(Continued)

*Primary Examiner* — Awet Haile
*Assistant Examiner* — Kent Krueger

(57) ABSTRACT

Systems and methods for analyzing and forecasting network traffic are disclosed. In some implementations, multiple points are received. Each point represents a time value and a network traffic value. For each point in the multiple points, the network traffic value is decomposable into a trend component, a seasonality component, a burst component, and a random error component. A trend equation is generated for calculating the trend component based on the time value. A seasonality equation is generated for calculating the seasonality component based on the time value. A burst equation is generated for calculating the burst component based on the time value. A random error equation is generated for calculating the random error component. A network traffic equation is generated for calculating the network traffic value based on the time value by combining the trend equation, the seasonality equation, the burst equation, and the random error equation.

20 Claims, 4 Drawing Sheets

(56) References Cited

OTHER PUBLICATIONS

Wang et al., "Network Traffic Prediction Based on Seasonal ARIMA Model," Proceeding of the 5th World Congress on Intelligent Control, (2004).
Tsao et al, "Design and Evaluation of UMTS-WLAN Interworking Strategies," Computer & Communications Research Labs. (2002).
Szlovencsak et al., "Planning Reliable UMTS Terrestrial Access Networks," IEEE Communication Networks (2002).
Khan et al., "QoE Prediction Model and its Application in Video Quality Adaptation Over UMTS Networks," IEEE Transactions on Multimedia, 14(2):431-442 (2011).
Navaie et al., "A Framework for UMTS Air Interface Analysis," Can. J. Elect. Computer Eng., 28(3/4)113-129 (2003).
Engels et al., "Autonomous Self-Optimization of Coverage and Capacity in LTE Cellular Networks," IEEE Transactions on Vehicular Technology, 62(5):1989-2004 (2013).
Amzallag et al., "Cell Selection in 4G Cellular Networks," IEEE Transactions on Mobile Computing, 12(7):1443-1455 (2013).
Ricciato et al., "Traffic Monitoring and Analysis for the Optimization of a 3G Network," IEEE Wireless Communications, pp. 42-49 (2006).
Ye Ouyang et al., "A Performance Analysis of UMTS PS Network Based on Multivariate KPIs", IEEE Wireless Telecommunications Symposium 2010. Tampa, FL, USA Apr. 21-23, 2010.

* cited by examiner

ANALYZING AND FORECASTING NETWORK TRAFFIC

CROSS-REFERENCE TO RELATED APPLICATION

This application is related to U.S. patent application Ser. No. 14/248,056, entitled "ESTIMATING LONG TERM EVOLUTION NETWORK CAPACITY AND PERFORMANCE," and being filed concurrently herewith, the entire content of which is incorporated herein by reference.

BACKGROUND

In the recent past, cellular network use has increased greatly as more and more users purchase smartphones that provide cellular data services, as well as traditional voice and text messaging services. As a result, mobile operators need to operate cellular network infrastructure capable of handling greater cellular data traffic. Failing to do so may result in unsatisfied customers since they are unable to use their mobile phones to quickly access information. The mobile operators may not wish to invest money in creating cellular network infrastructure beyond the required demand by their customers.

As the foregoing illustrates, an approach for forecasting future cellular network traffic may be desirable, for example, by mobile operators to aid in cellular network infrastructure investment decisions.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As set forth above, an approach for forecasting future cellular network traffic may be desirable. The subject technology provides techniques for analyzing and forecasting network traffic. The network traffic may correspond to cellular network traffic, for example, 3G, 4G, or long term evolution (LTE) network traffic. Some implementations of the subject technology may include generating a network traffic equation, which has a network traffic value as a dependent variable and a time value as an independent variable.

Figure 1:
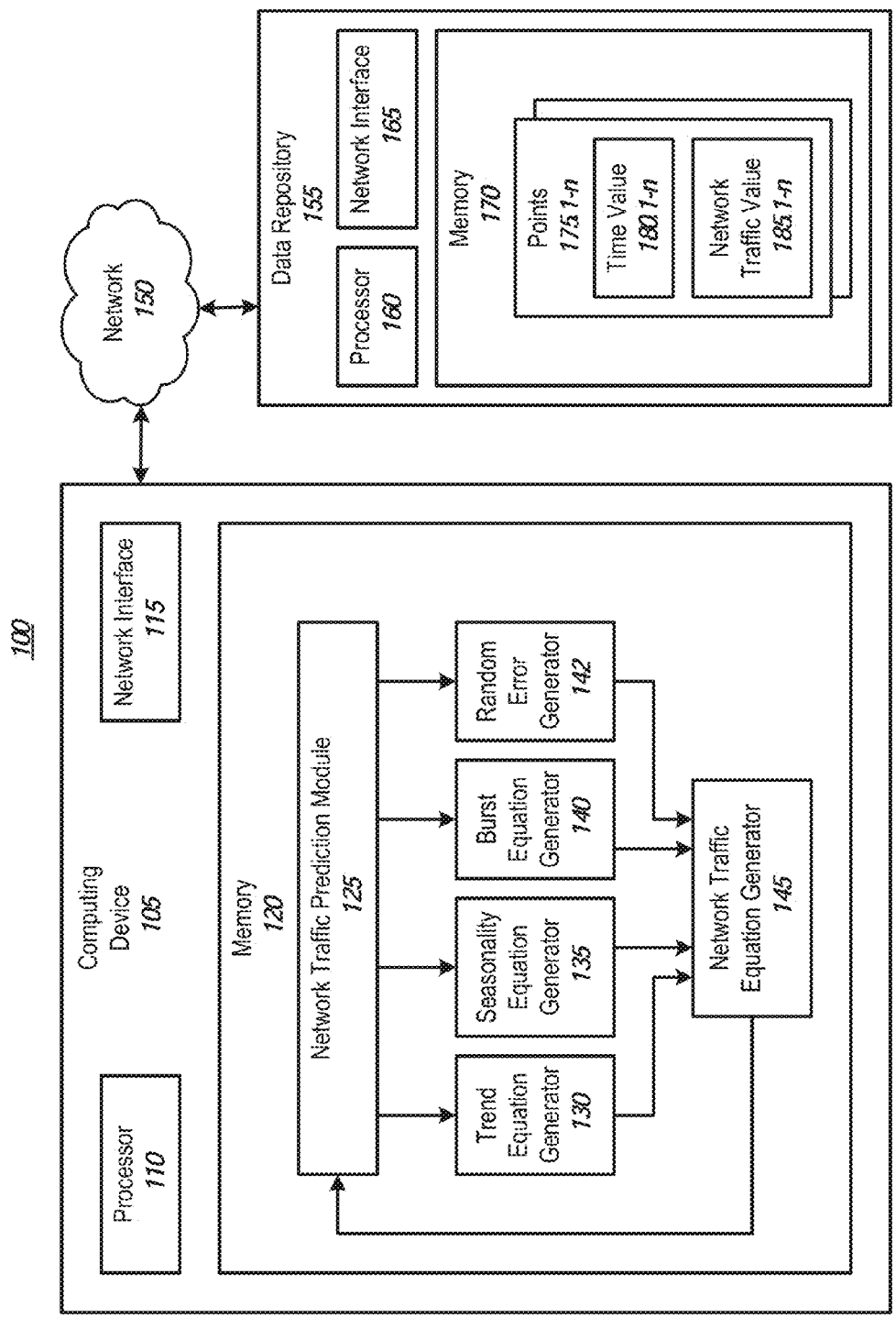
FIG. 1 illustrates an exemplary system for analyzing and forecasting network traffic.

FIG. 1 illustrates an exemplary system 100 for analyzing and forecasting network traffic. As shown, the system 100 includes a computing device 105 and a data repository 155 connected to one another via a network 150. The network 150 may include one or more of the Internet, an intranet, a wired network, a wireless network, a local area network, a wide area network, a virtual private network (VPN), etc.

The data repository 155 includes a processor 160, a network interface 165, and a memory 170. The processor 160 executes programmed instructions, which may be stored in the memory 170. While a single processor 160 is illustrated, the data repository 155 may have one or multiple processors. If there are multiple processors, the multiple processors may together carry out the functionality of the processor 160 described herein. The multiple processors may be arranged in processing unit(s), for example, a central processing unit (CPU) or a graphics processing unit (GPU). The network interface 165 connects the data repository 155 to the network 150. The network interface 165 may include one or more network interface controllers (NICs). The memory 170 stores data or instructions. As shown, the memory 170 stores a plurality of points 175.1-$n$.

The memory 170 may store any number of points 175.1-$n$, for example, thousands or millions of points 175.1-$n$. Each point 175.$a$, where a corresponds to a number between 1 and n, includes a time value 180.$a$ and a network traffic value 185.$a$. The time value 180.$a$ indicates a time, for example, Wednesday, Mar. 26, 2014, at 7 AM Eastern Standard Time. The network traffic value 185.$a$ corresponds to measured network traffic at a time corresponding to the time value 180.$a$ in a specified geographic area, for example, the city of Los Angeles, and associated with a specified network, for example, the LTE network of the mobile operator Verizon Wireless®. The points 175.1-$n$ stored in the data repository 155 may be used to study the network traffic of the specified network in the specified geographic area.

The computing device 105 includes a processor 110, a network interface 115, and a memory 120. The processor 110 executes programmed instructions, which may be stored in the memory 120. While a single processor 110 is illustrated, the computing device 105 may have one or multiple processors. If there are multiple processors, the multiple processors may together carry out the functionality of the processor 110 described herein. The multiple processors may be arranged in processing unit(s), for example, a central processing unit (CPU) or a graphics processing unit (GPU). The network interface 115 connects the computing machine 105 to the network 150. The network interface 115 may include one or more network interface controllers (NICs). The memory 120 stores data or instructions. As shown, the memory 120 stores a network traffic prediction module 125, a trend equation generator 130, a seasonality equation generator 135, a burst equation generator 140, a random error generator 142, and a network traffic equation generator 145.

The network traffic prediction module 125 includes instructions for execution by the processor 110. When executing the network traffic prediction module 125, the processor 110 receives the points 175.1-$n$ from the data repository 155. As described above, each point 175.$a$ represents a time value 180.$a$ and a network traffic value 185.$a$. The network traffic value 185.$a$ is decomposable into a trend component, a seasonality component, a burst component, and a random error component. The decomposing may be completed using appropriate machine learning or data mining technique(s) and may be based on the time value and one or more other points in the plurality of points, as described in greater detail below.

As used herein, the phrase "machine learning" may refer to, among other things, a branch of artificial intelligence that concerns the study of systems that can learn from data. For example, in addition to the techniques described herein, machine learning may be used in a spam filter that determines whether email messages are spam or non-spam, or in optical character recognition, which recognizes a handwritten or printed character in an image as a character in an alphabet.

As used herein, the phrase "data mining" may refer to, among other things, a computational process of discovering pattern(s) in large data set(s). One goal of data mining may be to extract information from a data set and transform it into an understandable structure for further use. For example, in addition to the techniques described herein, data mining may be used in an online shopping environment to recommend, to a customer, item(s) to purchase based on the customer's past purchases and purchases by other customers who acquired the same or similar items. In addition, data mining may be used in predicting future weather or vehicular traffic based on past weather or vehicular traffic patterns.

The trend component corresponds to a long-term trend of the network traffic value, for example, a monthly trend or a yearly trend. Alternatively, any other long-term trend, for example, a trend ranging from a monthly trend to a yearly trend, may be used. In the long-term, the network traffic value may increase (or, conversely, decrease) due to increased network usage by existing subscribers or due to an increase in subscriber count. The seasonality component corresponds to a periodicity of the network traffic value. The periodicity may have a weekly (seven day) period due to weekly trends in cellular network usage. For example, business users may use the cellular network most during business hours while personal users may use the cellular network most during evenings or weekends. The burst component corresponds to a predictable outlier of the network traffic value from the combination of the trend component and the seasonality component. For example, bursts in cellular network traffic may occur during holidays (e.g., if Christmas falls on a Wednesday, cellular network traffic may be different from an ordinary Wednesday, as predicted by the trend component and the seasonality component), special events (e.g., Black Friday or state sales tax holiday), or cultural events (e.g., the Super Bowl or presidential election day). Bursts in cellular network traffic may also occur during tourist seasons. For example, a college resort in Florida may experience bursts during spring break season. A ski resort in Colorado may experience bursts during ski season.

The random error component may correspond to variations in the network traffic value, which cannot be explained using the trend component, the seasonality component, and the burst component. For example, there may be variation in cellular network traffic on some days that cannot be explained by the trend component, the seasonality component, or a predictable burst. The random error component among the plurality of points may have a normal distribution or a Poisson distribution.

When executing the network traffic prediction module 125, the processor 110 invokes the trend equation generator 130 to generate, using machine learning or data mining techniques, a trend equation for calculating the trend component based on the time value 180.a. The operation of the trend equation generator 130 is described in greater detail below. The processor 110 invokes the seasonality equation generator 135 to generate, using machine learning or data mining techniques, a seasonality equation for calculating the seasonality component based on the time value 180.a. The operation of the seasonality equation generator 135 is described in greater detail below. The processor 110 invokes the burst equation generator 140 to generate, using machine learning or data mining techniques, a burst equation for calculating the burst component based on the time value 180.a. The operation of the burst equation generator 140 is described in greater detail below.

When executing the network traffic prediction module 125, the processor 110 invokes the network traffic equation generator 145 to generate a network traffic equation for calculating the network traffic value 185.a based on the time value 180.a. The network traffic equation generator 145 may generate the network traffic equation by combining the trend equation, the seasonality equation, the burst equation, and the random error. The operation of the network traffic equation generator is described in greater detail below.

When executing the network traffic prediction module 125, the processor 110 provides an output indicating that the network traffic equation has been generated. The output may be provided via a display unit of the computing device 105 or transmitted to another computer via the network 150. The output may include the network traffic equation itself or another indication that the network traffic equation has been generated.

The trend equation generator 130, when executed by the processor 105, causes the processor 105 to generate an equation for the trend component T(t) as related to the time value t. The trend component T(t) reflects how user behaviors, rate plan policy, and changes of user numbers impact network traffic over the long-term (e.g., monthly, three-month, or annual intervals). The equation for the trend component may be generated by studying the relationship of the time value 180.a to the network traffic value 185.a at a large time granularity (e.g., daily or weekly) and over long periods of time. Outlier values that are very (e.g., more than two or three standard deviations) different from the overall trend may be excluded, as these are likely due to sporadic burst (which may be measured by the burst component) or periodic/seasonal impact (which may be measured by the seasonality component). The remaining values may be subject to piecewise regressions of multiple different curves (e.g., linear, quadratic, exponential, logarithmic, local weighted scatter smoothing, etc.) to find optimal best fit curve(s) for all of the pieces.

In some examples, a time series for the network traffic value 185.a as related to the time value 180.a may be split into several pieces, each having a length given by m. In a short term prediction such as 0-60 days, m may be 10; in a middle term prediction ranging from 60-180 days, m may be 20; in a long term prediction of more than 180 days, m may be 30 or more. The statistical techniques of u−2sigma and u+2sigma may be applied at 95% confidence level as the lower and upper bound to exclude the outliers. Alternatively, Inter-Quartile Range (IQR) may be used to exclude outliers. Afterwards, the m pieces of data may be fitted together piecewise. The trend component may be computed by Equation 1.

$$T(t) = f\{X_K, \text{Slope}_K\} \qquad \text{Equation 1}$$

In Equation 1, $X_k$ denotes the first fitted value in each piece k. $\text{Slope}_k$ denotes the slope of each piece k. The fitting process may be as follows. First, a time series of the network traffic value 185.1-$n$ with respect to the time value 180.1-$n$ is divided into m pieces, k=1 to m. For piece k=1, a line is fitted having Slope$_1$ and a starting point=X$_1$. For each subsequent piece, k=2 to m, a line is fitted having Slope$_k$ and a starting point corresponding to the last fitted point of line$_{k-1}$. This ensures that the lines are interconnected without any gaps between the lines. The slope of each line, Slope$_k$, is set to minimize the mean error rate between the fitted value and the true value in each piece k=1 to m.

In some cases, the network traffic value may change sharply before a turning point, then change slowly after the turning point. For example, in a school area, the network traffic value may change sharply at the beginning and end of school vacation(s). During school vacation periods and periods when school is in session, the network traffic value may remain relatively stable. Such sharp changes may not be recognized as bursts or seasonal changes, depending on the period of the seasonality component or the granularity of the burst component. Thus, such sharp changes may be handled by the trend component. In order to avoid extrapolation of extreme periodic changes, (e.g., network traffic on a college campus where classes end for summer vacation on May 15 may decrease by 90% between May 1 and June 1, but should not be predicted to decrease by 90% again between June 1 and July 1) a compensation formula may be applied to the trend component. The compensation formula may ensure that the current slope is greater than a constant multiplied by the minimum of the N previous slopes, as set forth in Equation 2 below:

$$\text{NewSlope}_k = \text{Max}\{\text{Slope}_k, \gamma * \text{Min}\{\text{slope}_{k-N}, \text{slope}_{k-N+1}, \ldots \text{slope}_{k-1}\}\} \quad \text{Equation 2}$$

In Equation 2, N and γ are constants that may be adjusted to optimal values. In one example, N=5 and γ=0.9.

The seasonality equation generator 135, when executed by the processor 105, causes the processor 105 to generate an equation for the seasonality component. The seasonality component may represent periodic changes in traffic during a period of a predetermined length (e.g., a weekly period) as network traffic over a weekly period is correlated due to people engaging in similar activities on similar days of the week. For example, the wireless network traffic in Chicago on Saturday, Mar. 1, 2014, at 8 PM may be highly similar to the wireless network traffic in Chicago on Saturday, Mar. 8, 2014, at 8 PM. Alternatively, other periods different from seven days may be used. For example, in a country with a six-day cycle of work or school days, a period of six days may be used. In some case, the cycle of the periodicity component may be different from the cycle of work or school days.

To generate the seasonality equation, the length of a period may be determined. A time series of network traffic values of length L may be provided. The possible period lengths, i, may be between 1 and L/2, where in each i, there are j pieces. For example, L may be 70 days, i may be between 1 and 35 days, and the j pieces may represent the 24 hours in each day. For i=1 to L/2, the variance for each piece j in each i, $\sigma_{ij}^2$, may be computed. The variances for each piece j in each period i may be computed and represented by $$\sigma_{i\_Within}^2 = \sum_{j=1}^{i} \sigma_j^2.$$

For each i between 1 and L/2, the number of sample points in each piece i may be p. In other words, p=L/i. For each i between 1 and L/2, p sets of sample data, numbered q=1 to p, may be constructed, each of which includes samples for the same i value. The variance for each value of p may be computed as $\sigma_{ip}^2$. The variance of each piece p in each period i may be summed, represented as $$\sigma_{i\_Between}^2 = \sum_{q=1}^{p} \sigma_q^2.$$

The value of i between 1 and L/2 that has the minimal value of $\sigma_{i\_Between}^2 / \sigma_{i\_Within}^2$ may be selected as the period for the seasonality component. Alternatively, the Analysis of Variance (ANOVA) technique may be used to select the value of i.

After the length of the period, i, is obtained, the value of the seasonality component of each period may be determined. The value of the seasonality component in each position q (where q varies between 1 and p) may correspond to the mean value of data points at the same position q in the p sample sets. In some examples, the seasonality component may be represented as set forth in equation 3, where S represents the seasonality component and X represents the network traffic value from the time series.

$$S_{pi}(t) = \sum_{q=1}^{p} X_{qi} / p \quad \text{Equation 3}$$

The burst equation generator 140, when executed by the processor 105, causes the processor 105 to generate an equation for the burst component. The burst component B(t), as above, indicates predictable changes to the network traffic value that are not represented by the trend or seasonality components. For example, if the seasonality component has a period of one week, the burst component may represent bursts in network traffic that occur due to various unusual (e.g., odd or unexpected) events, such as holidays (e.g., Thanksgiving Day) or cultural events (e.g., Shakespeare Festival, City Marathon, etc.). Other unpredictable or difficult-to-predict random variations, for example, if multiple users or multiple unexpected roaming users sporadically decide to make calls at the same time, may be represented by the random error component, which is described in more detail below. In some implementations, the burst equation may correspond to a table (or other data structure) storing the time(s) of each burst and the impact that each burst has on network traffic. For example, the burst equation table for Boston may store that the Boston Marathon occurs on April 15 of each year, and on this day cellular network traffic increases by 15%, due to people following the marathon. Thanksgiving Day occurs on the fourth Thursday of November, and on this day cellular network traffic decreases by 25% due to fewer business users accessing the network for business purposes and due to people spending time with their families instead of on their mobile devices. In other words, for each time $t_i$, where i varies between 1 and the number of known bursts, n, the burst equation may be represented as set forth in Equation 4.

$$B(t)_{Value} = \{\text{Burst}_{t1}, \text{Burst}_{t2}, \ldots, \text{Burst}_{tn}\} \quad \text{Equation 4}$$

Bursts represented by the burst component may occur in annual intervals (e.g., December 25 of each year) or in close-to-annual intervals (e.g., in annual intervals according to the Jewish Lunar Calendar, on the fourth Thursday of every November, during the week following the second Monday of April, etc.).

The random error generator 142 calculates the random error in each sample point. The random error may correspond to a difference between an actual, measured network traffic value 185.1-$n$ and a network traffic value predicted using the trend equation, the seasonality equation, and the burst equation. In predicting future network traffic values, the random error may be set to zero.

The network traffic equation generator 145, when executed by the processor 105, causes the processor 105 to generate a network traffic equation. The network traffic equation relates network traffic to time. In some cases, the network traffic equation may be derived from the trend equation, the seasonality equation, and the burst equation as set forth in Equation 5.

$$N(t)=(1+B(t))*(T(t)+S(t)+R) \quad \text{Equation 5}$$

In Equation 5, N(t) represents the network traffic value as a function of the time value. B(t) represents the burst component as a function of time. T(t) represents the trend component as a function of time. S(t) represents the seasonality component as a function of time. R represents the random error component, which may be measured by the random error generator 142 for actual, measured network traffic values 185.1-$n$. When predicting a future value of N(t), R may be set to zero.

The random error component R, as indicated above, may correspond to variation in the network traffic value 185.1-$n$, with respect to the time value 180.1-$n$, that cannot be explained using the trend component, the seasonality component, and the burst component. For example, there may be variation in cellular network traffic on some days that cannot be explained by the trend component, the seasonality component, or a predictable burst. The random error component R among the plurality of points 175.1-$n$ may have a normal distribution or Poisson distribution.

One example of a simplified traffic generation model for circuit-switched data and packet data is the Poisson model. In the Poisson model, the number of incoming packets or calls per time unit may follow the Poisson distribution. The length or size of each voice, text or data call may be modeled as an exponential distribution. The number of simultaneously ongoing calls may follow the Erlang distribution. In some cases, the Poisson traffic model may be memory-less, meaning that the Poisson traffic model may not reflect the bursty nature of packet data, also known as the long-range dependency. Alternatively, a non-memory-less model, for example the Pareto distribution model, may be used as a long-tail traffic model.

Figure 2:
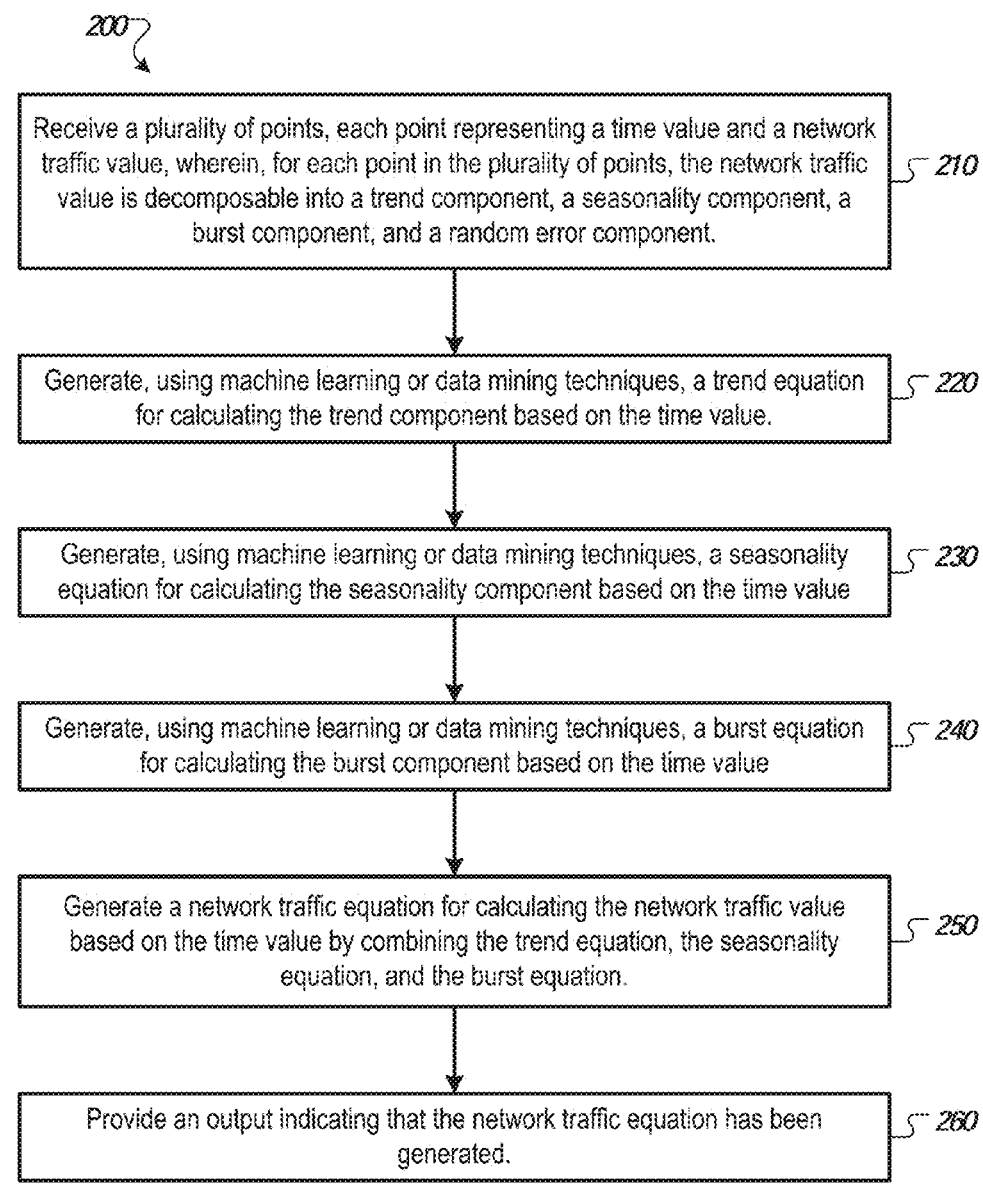
FIG. 2 illustrates an exemplary process for analyzing and forecasting network traffic.

FIG. 2 illustrates an exemplary process 200 for analyzing and forecasting network traffic. The process 200 begins at step 210, where a computing device (e.g., computing device 105 executing network traffic prediction module 125) receives a plurality of points (e.g., points 175.1-$n$). The plurality of points may be received from a data repository (e.g., data repository 155) that stores network data. The network data may be automatically measured by computer(s) analyzing the network. The computer(s) analyzing the network may include mobile device(s) accessing the network or other network(s), servers within the network, a base transceiver system, or Evolved Node B hardware that is connected to the network and communicates directly with end-user device(s), such as mobile handsets. Each point represents a time value and a network traffic value. The network traffic value may correspond to a measured network traffic at a time corresponding to the time value in a specified geographic area, for example, the LTE network traffic of the cellular carrier Verizon in New York City on Monday, Mar. 24, 2014, at 8 PM.

In step 220, the computing device generates, using machine learning or data mining techniques, for example, as discussed above, a trend equation for calculating the trend component based on the time value. The trend component may correspond to a regression (e.g., linear regression, quadratic regression, exponential regression, etc.) of monthly or three-month averages of the network traffic value. Thus, the trend component may take into account the long-term trends of the network traffic value while not taking into account periodic (e.g., weekly) fluctuations in the network traffic value.

In step 230, the computing device generates, using machine learning or data mining techniques, for example, as discussed above, a seasonality equation for calculating the seasonality component based on the time value. The seasonality component may correspond to a regression (e.g., linear regression, quadratic regression, exponential regression, etc.) or a set of what-if rules relating periodic (e.g., weekly) averages of network traffic values, while not taking into account the long-term trend measured by the trend component. An example of a what-if rule may be:

IF day=Monday, THEN the seasonality component is calculated based on time of day according to function #1.

IF day=Tuesday, Wednesday or Thursday, THEN the seasonality component is calculated based on time of day according to function #2.

IF day=Friday, THEN the seasonality component is calculated based on time of day according to function #3.

IF day=Saturday or Sunday, THEN the seasonality component is calculated based on time of day according to function #4.

The seasonality component may vary from one day of the week to another due to variations in personal and business use on different days. For instance, the seasonality component may reflect that user behavior is different on weekdays and weekends. For example, personal use may be more common on weekends and weekday evenings, while business use may be more common during weekdays. Also, in some cases, weekday business use may be greatest on Mondays, approximately average on Tuesdays, Wednesdays, and Thursdays, and lowest on Fridays.

In step 240, the computing device generates, using machine learning or data mining techniques, for example, as discussed above, a burst equation for calculating the burst component based on the time value. The burst component may correspond to a regression (e.g., linear regression, quadratic regression, exponential regression, etc.) or a set of what-if rules for predicting bursts (e.g., increases or decreases) of the network traffic value that are not accounted for by the trend component and the seasonality component. Examples of such bursts of the network traffic value occur during, holidays, special events, or cultural events. For example, in a geographic area where many businesses are closed on Christmas, many stores discount their prices on Black Friday, and many people follow the football game on Super Bowl Sunday, the trend component may include the following what-if rules (among others, for bursts on days not discussed below):

IF day=Christmas, THEN the burst component is calculated based on time of day according to function #5.

IF day=Black Friday, THEN the burst component is calculated based on time of day according to function #6.

IF day=Super Bowl Sunday, THEN the seasonality component is calculated based on time of day according to function #7.

The burst component may be different on Christmas, Black Friday, and Super Bowl Sunday due to changes in cellular network accessing behavior of users on these days. For example, business use may decrease on Christmas, and personal use may increase on Black Friday or Super Bowl Sunday. The burst component may not exist on some days (e.g., a typical Wednesday in March) that are not holidays, special events, or cultural events.

In step 250, the computing device generates a network traffic equation for calculating the network traffic value by combining the trend equation, the seasonality equation, and the burst equation. In some cases, the network traffic equation may be derived from the trend equation, the seasonality equation, and the burst equation as set forth above in the discussion of Equation 5. Alternatively, other equation(s), different from Equation 5, may be used to derive the network traffic equation from the trend equation, the seasonality equation, and the burst equation.

In step 260, the computing device provides, to a user, an output indicating that the network traffic equation has been generated. The forecasted network traffic may be based upon a granularity of per cell, per NodeB base station, per radio network controller (RNC) or RNC cluster, per mobile switching center (MSC), or per entire network. For example, the computing device may display the network traffic equation or forecasted future network traffic values via a display unit or display a message that the network traffic equation has been generated. The user interface at the display unit may provide, to a user viewing the display unit, the ability to view network specification(s) or any information based on which the network traffic equation of the forecasted future network traffic values were generated, for example, any of the information described herein. The user may access this ability using the input devices (e.g., mouse, keyboard, touchscreen, etc.) at the computing device. Alternatively, the computing device may transmit the network traffic equation or a message that the network traffic equation has been generated via a network, for example, to an email account or a short messaging service (SMS) account. After step 260, the process 200 ends.

The techniques disclosed herein may be used to predict future values of network traffic. In some examples, a computing device carrying out the process 200 may provide, to a user of the computing device, a recommendation for increasing (or decreasing) the network capacity to a level sufficient to handle the predicted future network traffic value. The user may be an employee of a mobile operator who is responsible for network capacity management. The amount by which the network capacity is to be decreased may be determined based on the current network capacity and the predicted future network traffic value, as described herein. Mobile operators may take various steps based on the predicted future values of network traffic. For example, if the predicted future network traffic in a certain geographic area, for example, Miami, Fla., is above the capacity the mobile operator can handle, the mobile operator may improve its network infrastructure in the geographic area to handle more traffic. Alternatively, the mobile operator may increase its prices or provide fewer advertisements (e.g., on local television or radio, on highway billboards, etc.) in the geographic area in attempts to decrease the number of users and, therefore, the network traffic.

Alternatively, if the predicted future network traffic in a certain geographic area, for example, Seattle, Wash., is well below capacity, mobile network infrastructure in the geographic area may be reduced or prices may be decreased and advertising may be increased to encourage more users in the geographic area to use the network. In some cases, based on the analysis and forecasting, if feasible, infrastructure components may be moved from low-demand areas (e.g., Seattle) to high-demand areas (e.g., Miami) to ensure that existing cellular network infrastructure is used most optimally.

As noted above, mobile operators may take various steps based on predicted future values of network traffic. If there is expected to be slightly more network traffic than existing network resources can handle for a short period of time (e.g., for a one day festival) in a low user population geographic area, no steps may be taken as the cost to correct the deficiency exceeds any benefit to the mobile operator (e.g., in increased customer goodwill and admiration of provided service). If there is expected to be much more network traffic than existing network resources can handle for a short amount of time, additional network resources (e.g., additional cell tower capacity) may be temporarily provided to the impacted geographic area. Of course, the availability of additional cell towers for provision may be taken into account. For example, additional cell tower capacity may be provided to a rural resort in Upstate New York on a day when there is a Shakespeare Festival there, as demand in other areas may not be impacted. However, additional cell tower capacity may not be provided all around the country on Presidential Election Day, as there is no location from which the capacity may be taken, and Presidential Election Day occurs relatively infrequently (e.g., once every four years). Cellular tower capacity may be increased, for example, by installing portable cellular towers or portable capacity enhancements for existing cellular towers.

If much more network traffic is expected than existing network resources can handle for a long amount of time, the mobile operator may provide additional long-term capacity (e.g., build additional cellular towers) to the impacted geographic area or increase prices or reduce advertising in the impacted geographic area (e.g., to discourage cellular network usage or encourage customers to switch to other mobile operators). The mobile operator may decide whether to provide additional long-term capacity or increase prices and reduce advertising based on the importance of the geographic area to the mobile operator. For example, if many of the mobile operator's customers live in New York City and network traffic exceeds capacity there, the mobile operator may increase network capacity in New York City. However, if few customers live in Rhode Island and network traffic exceeds capacity there, the mobile operator may choose to increase prices or decrease advertising in Rhode Island, rather than investing in increased network capacity in Rhode Island. In some cases, instead of or in addition to increasing prices or reducing advertising, the mobile operator may provide incentives for users not to use its network. The incentives may include, for example, providing free or discounted calls, text messages, music downloads, or video downloads if a user agrees to reduce his/her network usage to below a certain threshold (e.g., 1 GB per month) or to restrict his/her larger downloads to times when the network is not congested (e.g., between 9 PM and 6 AM).

According to some aspects, computing device(s) implementing the techniques described herein may inform users that the network is expected to operate at capacity, above capacity, or below capacity in the future. The computing devices may also notify the user of action(s) the user (e.g., a network administrator for a mobile operator) can take to improve the network capacity. For example, a notification may urge investing in new network infrastructure or moving existing network infrastructure from one geographic location to another, as well as indicating the projected network usage, current network capacity, difference between the current capacity and projected usage.

Figure 3:
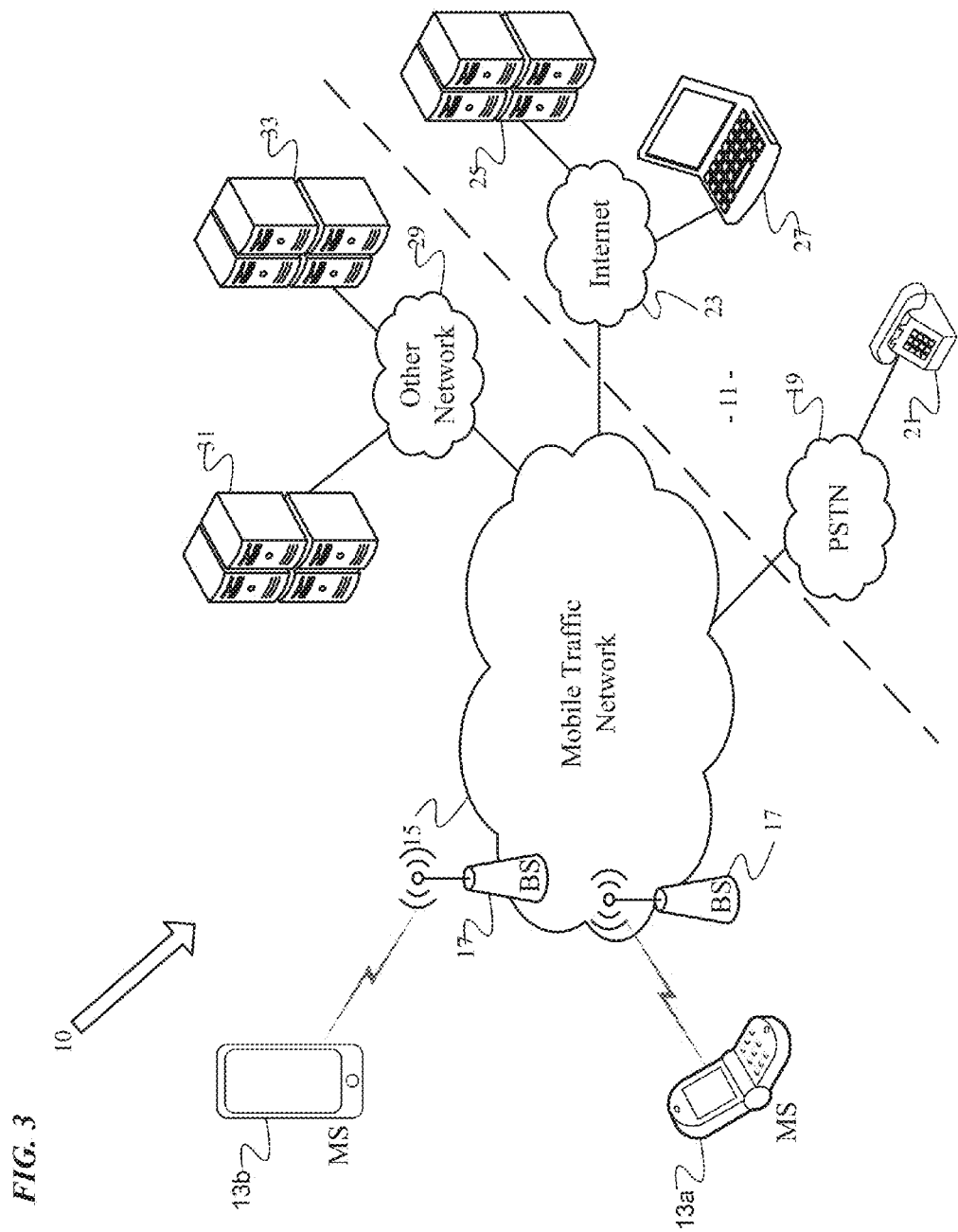
FIG. 3 is a high-level functional block diagram of an example of a system of networks/devices that provide various communications for mobile stations, for which network traffic may be analyzed and forecasted.

FIG. 3 illustrates a system 10 offering a variety of mobile communication services. The example shows simply two mobile stations (MSs) 13a and 13b as well as a mobile communication network 15. The stations 13a and 13b are examples of mobile stations. The network 15 provides mobile wireless communications services to those stations as well as to other mobile stations (not shown), for example, via a number of base stations (BSs) 17. The network 15 may correspond to the network that is being studied by the network traffic prediction module 125 of FIG. 1. The present techniques may be implemented in or used to study any of a variety of available mobile networks 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Universal Mobile Telecommunications System (UMTS) standard, the LTE standard belonging to 3GPP or other standards used for public mobile wireless communications. The mobile stations 13 may be capable of voice telephone communications through the network 15. Alternatively or additionally, the mobile stations 13a and 13b may be capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks.

Mobile stations 13 can take the form of portable handsets, smart-phones or personal digital assistants, although they may be implemented in other form factors. Program applications can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13 communicates over the air with a base station 17 and through the traffic network 15 for various voice and data communications, e.g. through the Internet 23 with a server 25 and/or with application servers 31. Services offered by the mobile service carrier may be hosted on a carrier operated application server 31, for communication via the networks 15 and 29. Server such as 25 and 31 may provide any of a variety of common application or service functions in support of or in addition to an application program running on the mobile station 13. For a given service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10.

The subject technology may be implemented in conjunction with touch screen type mobile stations as well as to non-touch type mobile stations. Hence, our simple example shows the mobile station (MS) 13a as a non-touch type mobile station and shows the mobile station (MS) 13 as a touch screen type mobile station. Some implementation may involve at least some execution of programming in the mobile stations as well as implementation of user input/output functions and data communications through the network 15, from the mobile stations. Those skilled in the art presumably are familiar with the structure, programming and operations of the various types of mobile stations.

As shown by the above discussion, functions relating to analyzing and forecasting network traffic may be implemented on computers connected for data communication via the components of a packet data network, as shown in FIG. 3. For example, the computing device 105 may correspond to mobile station 13a, mobile station 13b, server 25, user terminal 27 or application servers 31. The data repository 155 may correspond to server 25, user terminal 27 or application servers 31. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. In operation, the code is stored within the general-purpose computer platform. At other times, however, the software may be stored at other locations and/or transported for loading into the appropriate general-purpose computer system. Execution of such code by a processor of the computer platform enables the platform to implement the methodology described herein.

Figure 4:
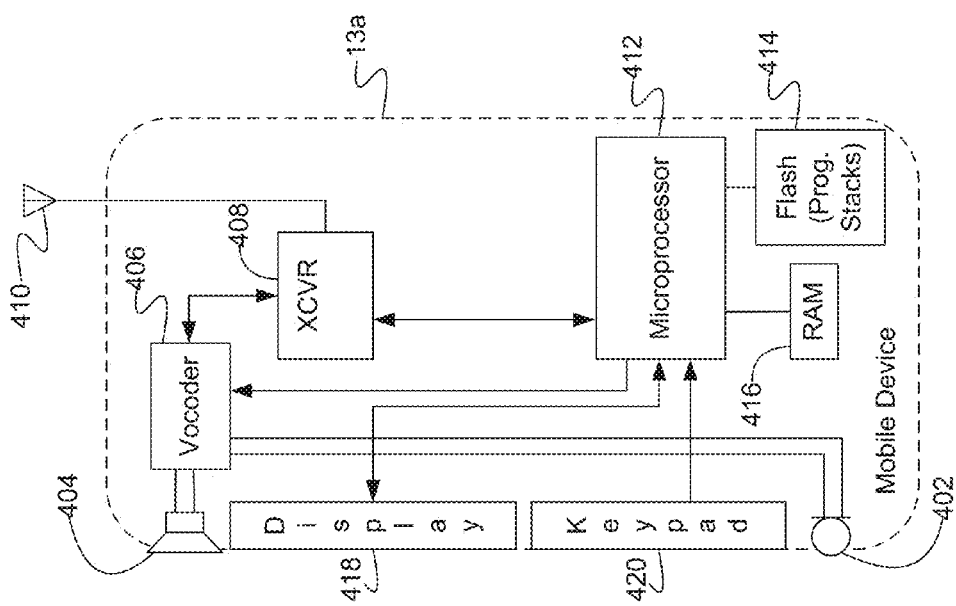
FIG. 4 is a high-level functional block diagram of an exemplary non-touch type mobile device which may be involved in analyzing and forecasting network traffic.

FIG. 4 provides a block diagram illustration of an exemplary non-touch type mobile device 13a, which may correspond to the mobile device 13. Although the mobile device 13a may be a smart-phone or may be incorporated into another device, such as a personal digital assistant (PDA) or the like, for discussion purposes, the illustration shows the mobile device 13a is in the form of a handset. The handset embodiment of the mobile device 13a functions as a normal digital wireless telephone station. For that function, the mobile device 13a includes a microphone 402 for audio signal input and a speaker 404 for audio signal output. The microphone 402 and speaker 404 connect to voice coding and decoding circuitry (vocoder) 406. For a voice telephone call, for example, the vocoder 406 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile device 13a also includes at least one digital transceiver (XCVR) 408. The mobile device 13a may be configured for digital wireless communications using one or more of the common network technology types. The concepts discussed here encompass embodiments of the mobile device utilizing any digital transceivers that conform to current or future developed digital wireless communication standards. The mobile device may also be capable of analog operation via a legacy network technology.

The transceiver 408 provides two-way wireless communication of information, such as vocoded speech samples and/or digital information, in accordance with the technology of the network 165. The transceiver 408 also sends and receives a variety of signaling messages in support of the various voice and data services provided via the mobile device 13a and the communication network. Each transceiver 408 connects through RF send and receive amplifiers (not separately shown) to an antenna 410. The transceiver may also support various types of mobile messaging services, such as short message service (SMS), enhanced messaging service (EMS) and/or multimedia messaging service (MMS).

The mobile device 13a includes a display 418 for displaying messages, menus or the like, call related information dialed by the user, calling party numbers, etc. A keypad 420 enables dialing digits for voice and/or data calls as well as generating selection inputs, for example, as may be keyed-in by the user based on a displayed menu or as a cursor control and selection of a highlighted item on a displayed screen. The display 418 and keypad 420 are the physical elements providing a textual or graphical user interface. Various combinations of the keypad 420, display 418, microphone 402 and speaker 404 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections.

A microprocessor 412 serves as a programmable controller for the mobile device 13a, in that it controls all operations of the mobile device 13a in accordance with programming that it executes, for all normal operations, including those under consideration here. In the example, the mobile device 13a includes flash type program memory 414, for storage of various "software" or "firmware" program routines and mobile configuration settings, such as mobile directory number (MDN) and/or mobile identification number (MIN), etc. The flash type program memory 414 stores programed instructions, including those described herein. The mobile device 13a may include a non-volatile random access memory (RAM) 416 for a working data processing memory. Of course, other storage devices or configurations may be added to or substituted for those in the example. In a present implementation, the flash type program memory 414 stores firmware such as a boot routine, device driver software, an operating system, call processing software and vocoder control software, and any of a wide variety of other applications, such as client browser software and short message service software. The memories 414, 416 also store various data, such as telephone numbers and server addresses, downloaded data such as multimedia content, and various data input by the user. Programming stored in the flash type program memory 414, sometimes referred to as "firmware," is loaded into and executed by the microprocessor 412.

As outlined above, the mobile device 13a includes a processor, and programming stored in the flash memory 414 configures the processor so that the mobile device is capable of performing various desired functions, including those described herein.

Figure 5:
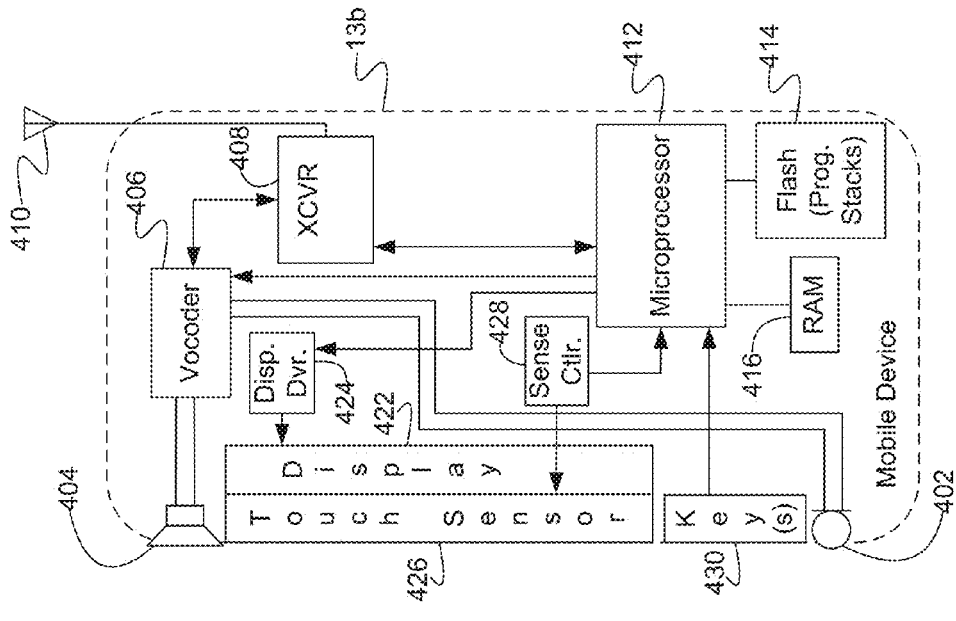
FIG. 5 is a high-level functional block diagram of an exemplary touch screen type mobile device which may be involved in analyzing and forecasting network traffic.

For purposes of such a discussion, FIG. 5 provides a block diagram illustration of an exemplary touch screen type mobile device 13b. Although possible configured somewhat differently, at least logically, a number of the elements of the exemplary touch screen type mobile device 13b are similar to the elements of mobile device 13a, and are identified by like reference numbers in FIG. 5. For example, the touch screen type mobile device 13b includes a microphone 402, speaker 404 and vocoder 406, for audio input and output functions, much like in the earlier example. The mobile device 13b also includes at least one digital transceiver (XCVR) 408, for digital wireless communications, although the mobile device 13b may include an additional digital or analog transceiver. The concepts discussed here encompass embodiments of the mobile device 13b utilizing any digital transceivers that conform to current or future developed digital wireless communication standards. As in the mobile device 13a, the transceiver 408 provides two-way wireless communication of information, such as vocoded speech samples and/or digital information, in accordance with the technology of the network 165. The transceiver 408 also sends and receives a variety of signaling messages in support of the various voice and data services provided via the mobile device 13b and the network 165. Each transceiver 408 connects through RF send and receive amplifiers (not separately shown) to an antenna 410. The transceiver may also support various types of mobile messaging services, such as short message service (SMS), enhanced messaging service (EMS) and/or multimedia messaging service (MMS).

As in the example of the mobile device 13a, a microprocessor 412 serves as a programmable controller for the mobile device 13b, in that it controls all operations of the mobile device 13b in accordance with programming that it executes, for all normal operations, and for operations described herein. In the example, the mobile device 13b includes flash type program memory 414, for storage of various program routines and mobile configuration settings. The mobile device 13b may also include a non-volatile random access memory (RAM) 416 for a working data processing memory. Of course, other storage devices or configurations may be added to or substituted for those in the example. Hence, outlined above, the mobile device 13b includes a processor, and programming stored in the flash memory 414 configures the processor so that the mobile device is capable of performing various desired functions, including the functions described herein.

In the example of FIG. 5, the user interface elements included a display and a keypad. The mobile device 13b may have a limited number of key(s) 430, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile device 13b includes a display 422, which the microprocessor 412 controls via a display driver 424, to present visible outputs to the device user. The mobile device 13b also includes a touch/position sensor 426. The sensor 426 is relatively transparent, so that the user may view the information presented on the display 422. A sense circuit 428 sensing signals from elements of the touch/position sensor 426 and detects occurrence and position of each touch of the screen formed by the display 422 and sensor 426. The sense circuit 428 provides touch position information to the microprocessor 412, which can correlate that information to the information currently displayed via the display 422, to determine the nature of user input via the screen.

The display 422 and touch sensor 426 (and possibly one or more keys 430, if included) are the physical elements providing the textual and graphical user interface for the mobile device 13b. The microphone 402 and speaker 404 may be used as user interface elements for audio input and output.

The structure and operation of the mobile devices 13a and 13b, as outlined above, were described to by way of example, only.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving, at a computing device, a plurality of points, each point representing a time value and a network traffic value representative of traffic on a communication network, the network traffic values and the time values represented by the plurality of points decomposable into a trend component, a seasonality component, a burst component, and a random error component;
    generating, using machine learning or data mining techniques, a trend equation for calculating the trend component, the trend component taking into account a long-term trend of the network traffic values and one or more sharp changes in network traffic, the sharp changes followed by stable periods and caused by predictable bursts or seasonal network traffic patterns but not accounted for in the seasonality component due to a periodicity of the seasonality component and not accounted for in the burst component due to a granularity of the burst component, the sharp changes taken into account in the trend component by a compensation formula applied to the trend component;
    generating, using machine learning or data mining techniques, a seasonality equation for calculating the seasonality component;
    generating, using machine learning or data mining techniques, a burst equation for calculating the burst component;
    generating a random error equation for calculating the random error component;
    generating a network traffic equation for predicting future network traffic values corresponding to future time values by combining the trend equation, the seasonality equation, the burst equation, and the random error equation; and
    providing, via the computing device to a network administrator responsible for the communication network:
        an indication of a current network capacity,
        an indication of a projected network usage based on the generated network traffic equation,
        an indication that the communication network is expected to operate above capacity at a future time corresponding to at least one of the future time values based on a difference between the current network capacity and the projected network usage, and
        a recommendation including an action for the network administrator to take to improve the current network capacity to meet the projected network usage prior to the future time.

2. The method of claim 1, wherein a granularity of network traffic associated with the network traffic equation comprises one or more of a granularity per: cell, NodeB base station, radio network controller (RNC), RNC cluster, mobile switching center (MSC) or entire cellular network.

3. The method of claim 1, further comprising determining, using the generated network traffic equation, that a predicted future network traffic value exceeds a network capacity, wherein the action included within the recommendation includes increasing the network capacity to a level sufficient to handle the predicted future network traffic value.

4. The method of claim 1, wherein:
    the trend component corresponds to a long-term trend of the network traffic value;
    the seasonality component corresponds to a periodicity of the network traffic value; and
    the burst component corresponds to a predictable outlier of the network traffic value from a combination of the trend component and the seasonality component.

5. The method of claim 4, wherein the long-term trend is a monthly trend or a yearly trend.

6. The method of claim 4, wherein the periodicity of the network traffic value is seven days.

7. The method of claim 1, wherein the random error component cannot be explained using the trend component, the seasonality component, and the burst component.

8. The method of claim 1, wherein the random error component among the plurality of points has a normal distribution.

9. The method of claim 1, wherein the network traffic value comprises a long term evolution (LTE) network traffic value.

10. A non-transitory computer-readable medium comprising instructions which, when executed by a computer, cause the computer to:
    receive a plurality of points, each point representing a time value and a network traffic value representative of traffic on a communication network, the network traffic values and the time values represented by the plurality of points decomposable into a trend component, a seasonality component, a burst component, and a random error component;

generate, using machine learning or data mining techniques, a trend equation for calculating the trend component, the trend component taking into account a long-term trend of the network traffic values and one or more sharp changes in network traffic, the sharp changes followed by stable periods and caused by predictable bursts or seasonal network traffic patterns but not accounted for in the seasonality component due to a periodicity of the seasonality component and not accounted for in the burst component due to a granularity of the burst component, the sharp changes taken into account in the trend component by a compensation formula applied to the trend component;

generate, using machine learning or data mining techniques, a seasonality equation for calculating the seasonality component;

generate, using machine learning or data mining techniques, a burst equation for calculating the burst component;

generate a random error equation for calculating the random error component;

generate a network traffic equation for predicting future calculating the network traffic values corresponding to future time values by combining the trend equation, the seasonality equation, the burst equation, and the random error equation; and provide, to a network administrator responsible for the communication network:
  an indication of a current network capacity,
  an indication of a projected network usage based on the generated network traffic equation,
  an indication that the communication network is expected to operate above capacity at a future time corresponding to at least one of the future time values based on a difference between the current network capacity and the projected network usage, and
  a recommendation including an action for the network administrator to take to improve the current network capacity to meet the projected network usage prior to the future time.

11. The computer-readable medium of claim 10, further comprising instructions which, when executed by the computer, cause the computer to determine, using the generated network traffic equation, that a predicted future network traffic value exceeds a network capacity, wherein the action included within the recommendation includes increasing the network capacity to a level sufficient handle the predicted future network traffic value.

12. The computer-readable medium of claim 10, wherein:
the trend component corresponds to a long-term trend of the network traffic value;
the seasonality component corresponds to a periodicity of the network traffic value; and
the burst component corresponds to a predictable outlier of the network traffic value from a combination of the trend component and the seasonality component.

13. The computer-readable medium of claim 12, wherein the long-term trend is a monthly trend or a yearly trend.

14. The computer-readable medium of claim 12, wherein the periodicity of the network traffic value is seven days.

15. The computer-readable medium of claim 10, wherein the random error component cannot be explained using the trend component, the seasonality component, and the burst component.

16. The computer-readable medium of claim 10, wherein the random error component among the plurality of points has a normal distribution.

17. The computer-readable medium of claim 10, wherein the network traffic value comprises a long term evolution (LTE) network traffic value.

18. A system comprising:
one or more processors; and
a memory comprising instructions which, when executed by the one or more processors, cause the one or more processors to:
  receive a plurality of points, each point representing a time value and a network traffic value representative of traffic on a communication network, the network traffic values and the time values represented by the plurality of points decomposable into a trend component, a seasonality component, a burst component, and a random error component;
  generate, using machine learning or data mining techniques, a trend equation for calculating the trend component, the trend component taking into account a long-term trend of the network traffic values and one or more sharp changes in network traffic, the sharp changes followed by stable periods and caused by predictable bursts or seasonal network traffic patterns but not accounted for in the seasonality component due to a periodicity of the seasonality component and not accounted for in the burst component due to a granularity of the burst component, the sharp changes taken into account in the trend component by a compensation formula applied to the trend component;
  generate, using machine learning or data mining techniques, a seasonality equation for calculating the seasonality component;
  generate, using machine learning or data mining techniques, a burst equation for calculating the burst component;
  generate a random error equation for calculating the random error component;
  generate a network traffic equation for predicting future network traffic values corresponding to future time values by combining the trend equation, the seasonality equation, the burst equation, and the random error equation; and
  provide, to a network administrator responsible for the communication network:
    an indication of a current network capacity,
    an indication of a projected network usage based on the generated network traffic equation,
    an indication that the communication network is expected to operate above capacity at a future time corresponding to at least one of the future time values based on a difference between the current network capacity and the projected network usage, and
    a recommendation including an action for the network administrator to take to improve the current network capacity to meet the projected network usage prior to the future time.

19. The system of claim 18, wherein:
the trend component corresponds to a long-term trend of the network traffic value;
the seasonality component corresponds to a periodicity of the network traffic value; and the burst component corresponds to a predictable outlier of the network traffic value from a combination of the trend component and the seasonality component.

20. The system of claim 19, wherein the long-term trend is a monthly trend or a yearly trend.

* * * * *